---

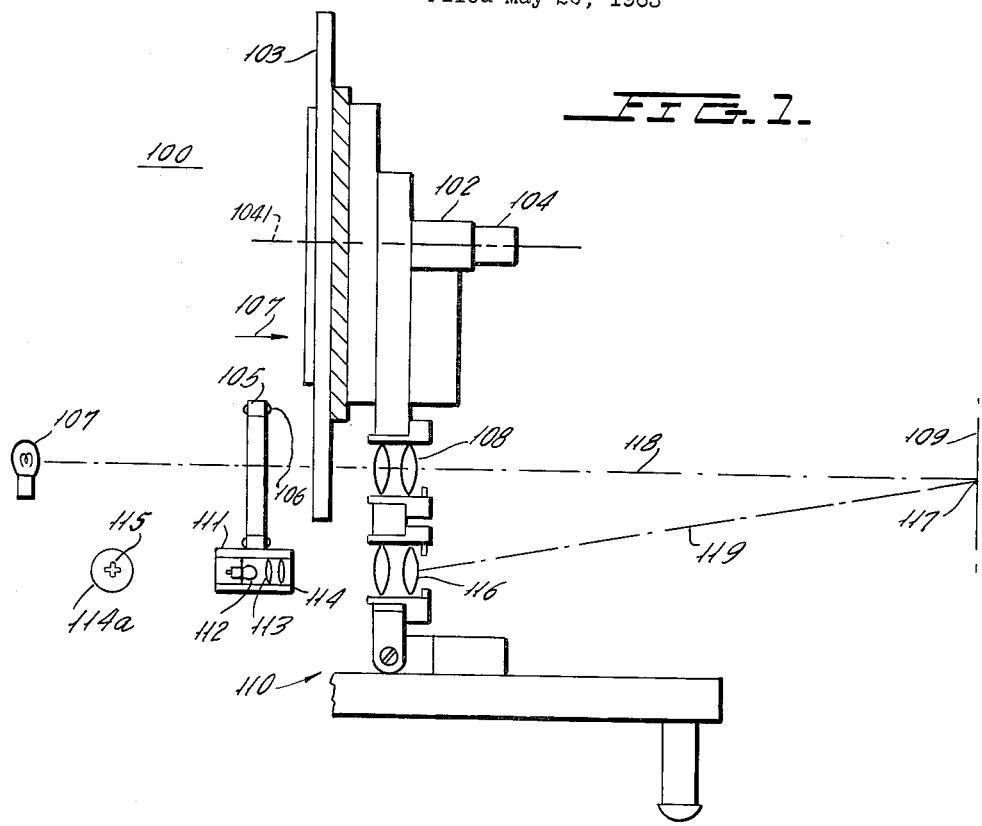
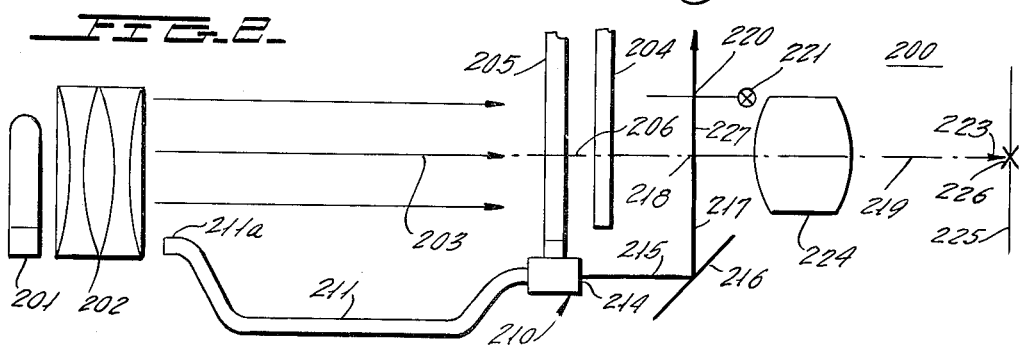
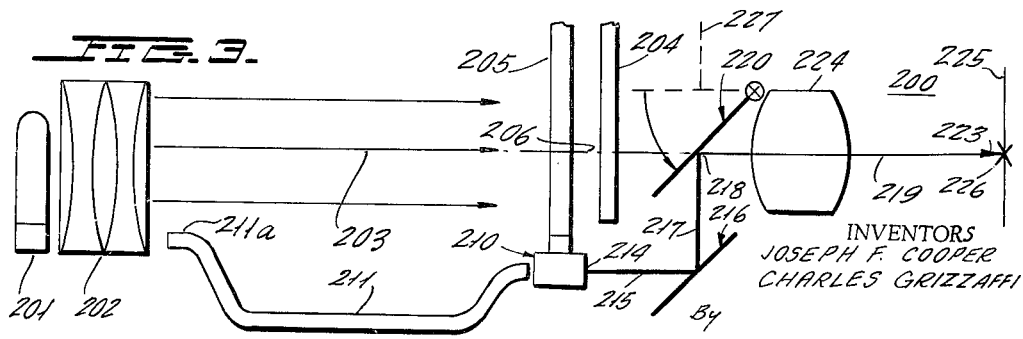
INVENTORS
JOSEPH F. COOPER
CHARLES GRIZZAFFI
By
OSTROLENK, FABER, GERB & SOFFEN
ATTORNEYS

United States Patent Office 3,246,562
Patented Apr. 19, 1966

3,246,562
STYLUS POSITION INDICATOR MEANS
Joseph F. Cooper, Fresh Meadows, and Charles Grizzaffi, New York, N.Y., assignors to Kollsman Instrument Corporation, Elmhurst, N.Y., a corporation of New York
Filed May 20, 1963, Ser. No. 281,502
7 Claims. (Cl. 88—24)

This invention relates to trajectory or figure projecting means and more particularly to a stylus position indicator for such data projection means which is so designed as to identify the position of the stylus and data projectors at any given instant.

In applications where it is desired to project upon a single screen a plurality of flying object trajectories, for example, it has been found to be highly desirable to employ data projectors of the type which project a black-white image wherein the white image represents the trajectory while the black image represents the background. Arrangements of this type have been found to be superior to the reverse type arrangements due to the fact that they permit multiple projections from a plurality of such projectors upon a single screen with substantially no significant effects being projected on to the screen. Data projectors of this type are set forth in great detail in copending U.S. applications bearing serial numbers, titles and filing dates as follows: 195,887, Projected Tracking Display, May 18, 1962, now U.S. Patent No. 3,151,927; 195,870, Data Projector Input Device, May 18, 1962, now U.S. Patent No. 3,160,462; 195,810, Data Projector Turret Assembly, May 18, 1962, now U.S. Patent No. 3,160,461; 194,901, Data Projector Slide Assembly, May 15, 1962; 195,871, Data Projector Stylus Assembly, May 18, 1962, now abandoned and substituted by continuation-in-part application Ser. No. 465,070 all of which are assigned to the assignee of the instant invention. Basically, data projectors of these general types are comprised of an opaque film which stands between the illuminating source and the data projector lens system and effectively projects no image upon the screen. The image is formed by a scribing stylus which scribes or etches away the opaque coating from the data projector film means sufficiently so that light passes through the scribed portion or portions so as to be magnified, focused and suitably projected on the screen.

In situations where a fresh or new opaque film is positioned between the illuminating source and the projector lens system, it is highly desirable to ascertain the exact position of the scribing stylus before operations of the data projector scribing means can be initiated. It is also further beneficial to know the position of the scribing stylus in cases where an already scribed opaque film is positioned between the illuminating source and the lens system, so that if it is desired to make a retrace of the trajectory already scribed into the opaque film, such an operation may be performed more readily if the exact position of the scribing stylus is known before the retrace is performed. Such a stylus positioning means has other useful functions, such as, for example, the function of acting as a suitable pointer means for specifically locating a position upon the screen, or instructive, educational or other possible purposes. Still another use of such a stylus position indicating means is that of providing a trace upon the screen which is not permanent in nature, so that the stylus positioning means may be used as an alternative means for providing an illuminated picture of the figure or trajectory to be traced, while at the same time avoiding the need for providing a permanent record of such trace.

The instant invention provides a stylus position indicating means for use in such data projectors which provides a simple, reliable means for indicating the exact position of the data projector scribing stylus at any given instant and which further, may be used to provide any type of a symbol or character projected upon the screen for identification, educational, training, or other purposes.

The instant invention is comprised of a secondary projection means, rigidly secured to the data projector stylus frame so that it experiences any movement experienced by the frame of the stylus. First and second, respectively, stationary and movable reflective means are provided wherein the first reflective means is positioned to reflect the image from the secondary projector means at an angle perpendicular to the optical axis of the data projector sytem. The movable reflective means is positioned so that when in the "out" position the data projector projects only the scribed image from the projector to the screen. However, when the movable reflective means is moved to the "in" position, it bends or reflects the perpendicularly aligned image emanating from the secondary projector upon the optical axis of the data projector so that it may be suitably projected upon the screen of the projector system. With this arrangement, the single objective lens system of the data projector is employed to magnify and focus images coming from both the trace upon the opaque film and from the secondary projector. The secondary projector is provided with a fiber bundle means fixedly secured to the projector at one end and having the second end fixedly secured to the illuminating means to provide suitable illumination for the secondary projector. The flexible bundle permits free, unimpeded movement of the secondary projector so that it may move freely with the stylus frame and also so that it does not present any significant burden upon the movable stylus frame. The forward end of the secondary projector means may be fitted with any one of a plurality of masks for the projection of any type of a symbol or character upon the screen.

As an alternative embodiment, the secondary projector may be provided with a secondary indicator lens having an eccentric fitting so as to project the image emanating from the secondary projector means upon the screen in the exact position that the stylus would project its image upon the screen if it had scribed a trace upon the opaque surface which it is designed to scribe.

It is therefore one object of the instant invention to provide stylus position indicating means for data projectors which is so designed as to provide an instantaneous indication of the stylus position at any given instant.

Another object of the instant invention is to provide a novel stylus position indicating means for use in data projectors and the like which is so designed as to provide a projected image upon the data projector system screen for the purpose of providing a trace upon said screen.

Still another object of the instant invention is to provide a novel stylus position indicating means for use in data projectors and the like which is so designed as to be utilizable as pointer means for training or instruction purposes.

Still another object of the instant invention is to provide novel stylus position indicating means for use in data projectors and the like wherein the indicating means is provided with movable reflector means for controlling the use of said indicating means.

Still another object of the instant invention is to provide novel stylus position indicating means for use in data projectors and the like which is so designed as to utilize the data projector lens system for magnifying and focusing the image from said indicating means.

Still another object of the instant invention is to provide novel stylus position indicating means for use in data projectors and the like which employs a flexible fibre bundle as the illuminating source to permit free movement of the data projector stylus frame.

These and other objects of the instant invention will become apparent when reading the accompanying description and drawings in which:

FIGURE 1 is a side plan view of one stylus position indicating means designed in accordance with the principles of the instant invention and further, showing portions of the data projector system related thereto for purposes of explaining the utilization of the instant invention.

FIGURE 2 is a schematic diagram of an alternative preferred embodiment for the stylus position indicating means of FIGURE 1.

FIGURE 3 shows the stylus position indicating means of FIGURE 2 in the "in" position.

Referring now to the drawings, FIGURE 1 shows a portion of a data projector system 100 which is set upon a suitable support, or table, not shown. The data projector 100 of FIGURE 1 may be of the type described in great detail in the aforementioned copending U.S. application Serial No. 195,887, now U.S. Patent No. 3,151,927 and a detailed description of such a data projector will be omitted here for purposes of clarity, however, it suffices from the point of view of understanding, to say that the data projector 100 is comprised of a front mounting plate 102 which is utilized to pivotally support for rotation thereupon an aluminized annular glass ring 103 which due to its aluminized coating is substantially opaque and prevents the passage of light therethrough. The annular ring 103 is pivoted to rotate about the axis designated by the phantom line 104'. As the annular ring 103 is rotated a portion thereof is positioned adjacent a stylus frame 105 which supports a scribing stylus or needle 106. The frame and stylus is movable by means not shown in the direction shown by arrow 107 so that the tip of stylus 106 engages the coating on the left-hand surface of the annular glass ring 103 thus permitting the stylus 106 to scribe or "scratch" a trace upon the surface of the annular ring 103. The stylus frame 105, and hence the stylus 106, is movable in both the horizontal and vertical directions in a plane parallel to the plane of the annular ring 103 so as to generate any desired trace upon the surface of annular ring 103.

The symbol of trace having been scribed upon the surface of annular ring 103, this trace is portrayed upon a screen 109 by virtue of an illuminating source 107 which passes light through the scribed portions upon the surface of annular ring 103 so as to form the trace which is then suitably magnified and focused by the objective lens system 108 which projects this trace or symbol upon the surface of the screen 109.

The stylus position indicator means 110 is comprised of a housing 111 having a light bulb or other suitable illuminating means 112 mounted thereto and which is electrically connected by means not shown to a suitable energy source for illuminating the light bulb 112. A first lens system 113 is provided near the forward end of housing 111, the right-hand end of which is covered with a mask 114, a front view of which is designated as 114a in FIGURE 1 shown offset to the left of the secondary projector means 110. The mask 114a is shown as having a substantially X-shaped slot 115 substantially centrally located therein so as to project a symbol X upon the screen 109.

The light source 112 passes through the X-shaped slot 115 in mask 114 and is magnified and focused by an indicator lens system 116 mounted immediately below the objective lens system 108. The indicator lens system 116 is mounted so as to have an eccentric alignment relative to the lens system 108 so that it projects its image upon the screen at the same exact location at which the stylus location would be projected upon the screen. For example, in FIGURE 1, the stylus 106, if it had scribed a dot upon the annular ring 103, would project the illuminated dot upon screen 109 at the location 117 where the optical axis 118 intercepts with the surface of screen 109. Thus, the eccentrically aligned lens system 116 thereby projects the image along the dotted line 119 in order that it project the X-shaped symbol at the location 117 to accurately identify the location of the stylus 106.

If it is desirable to utilize the stylus position indicating means 110 as a means for providing a trace upon the screen 109 without scribing the surface of annular ring 103, this may be one simply by utilizing the stylus, in the position shown in FIGURE 1, and moving it horizontally and vertically in the plane parallel to the annular ring 103 such that even through the stylus frame 105 and stylus 106 may experience horizontal and vertical movement, the stylus 106 being out of engagement with the surface of annular ring 103 fails to scribe any trace or symbol upon the ring. However, the movement of the frame 105 is directly imparted to the stylus position indicator means 110 and when suitably illuminated this X-shaped light beam may be portrayed upon the screen 109 to form any trace, symbol, or other suitable image. If desired, the opening in mask 114a may be of any other suitable configuration, such as, for example, an arrow head, a dot, a circle, an alphabetic character, a numeric character, and so forth.

An alternative embodiment 200 is shown in FIGURES 2 and 3 of the drawings and is comprised of an illuminating lamp 201 and a condensing lens system 202 for projecting substantially parallel light beams 203 which impinge upon the annular aluminized disc 204 in the same manner as previously described. The scribing stylus is mounted within the stylus frame 205 in the same manner as previously described and may experience the same horizontal and vertical movement in order to form the trace upon the surface of aluminized disc 204 as previously discussed. The secondary projector means 210 is fixedly secured along the underside of stylus frame 205. The secondary projector 210 utilizes a fibre bundle 211 as a random wound light carrier having a first end thereof positioned in close proximity to the condenser lens system 202 and a second end thereof fixedly secured to the rearward portion of the secondary projector means 210. The fibre bundle thereby "pipes" light from the lamp and condenser source 201–202 to the projector means while permitting complete freedom of movement of the stylus frame 205. The forward end of the secondary projector means is provied with a mask 214 in the same manner as previously described and when illuminated projects an illuminated image of the symbol or character scribed in the mask 214 along the line 215. A front surface mirror 216 positioned as shown in FIGURE 2, is inclined at an angle so as to deviate the path 215 of the reticle pattern image along the line 217 so that it intersects at 218 with the optical axis 219 of the data projector system 200. The image aligned in the direction shown by dashed line 227 passes through a beam splitter 220 which is comprised of an optically flat, thin [0.004–0.006 thickness] clear glass plate and hinged at pivot point 221 as shown. Suitable means (not shown) are provided for moving the pivotally mounted beam splitter 220 between the "out" position, shown in FIGURE 2, and the "in" position, shown in FIGURE 3. Considering first FIGURE 2, the image directed along the line 217 passes through the beam splitter 220 and does not interfere with the projection due to the scribed trace upon the aluminized disc or ring 204 which is projected in the direction shown by arrow 223 along the optical axis. The image or trace projected from the aluminized disc 204 passes through an objective lens system 224 which suitably magnifies and focuses the image and ultimately projects it upon screen 225. With the stylus 206 in, a position shown in FIGURE 2, an image would be projected upon screen 225 at location 226.

When the beam splitter means 220 is moved from the "out" position of FIGURE 2 to the "in" position of FIG- URE 3, the image from the secondary projector means 210 directed along the phantom line 217 strikes the surface of beam splitter 220 which deflects the image so that it is directed along the optical axis 219 of the data projector system along with the projected image from the scribed aluminized disc 204. Thus when the beam splitter 220 is in the "in" position it is inclined at a 45-degree angle to the optical axis 219 and is substantially parallel to the front surface mirror 216. In this position the image of the stylus position reticle is deviated by a 90-degree angle such that the axes of the stylus position reticle image bundle and of the stylus 206 become coincident. The two axes remain in coincidence for any position of the stylus in the field.

Part of the light comprising the stylus position reticle image bundle and directed along the phantom line 217 passes through the beam splitter means 220 and is not seen. This may result in a loss of some intensity of the image. This may be compensated for, however, by increasing the intensity of the reticle or mask illumination.

This same semi-transmission property of the beam splitter means 220 permits the image of any characters scribed on the aluminized disc 204 to remain visible on the screen, while the stylus position reticle image is being projected, since a portion of the stylus image will be deflected along the phantom line 227 while the remaining portion will pass through the beam splitting means 220 along the optical axis 219.

Thus, with this arrangement the character display or trace scribed upon the aluminized disc 204 remains unobstructed and is viewable upon the screen 225, except for a possible slight loss of intensity during the time that the beam splitting means is moved to the "in" position, as shown in FIGURE 3. Thus, the image of the stylus position reticle or mask 214 may be viewed simultaneously with that of the charcters or tracers scribed upon the aluminized disc 204.

Thus the exact position of the stylus 206 may be determined instantaneously by moving the beam splitter means 220 to the "in" position in FIGURE 3. Also, in the same manner as previously described, the stylus position indicating means of FIGURES 2 and 3 may be utilized to provide a trace upon the screen 225 without the stylus 206 scribing an image upon the surface of aluminized disc 204 simply by operating the stylus frame 205 in the desired manner, but with the stylus 206 positioned so that it does not engage the surface of disc 204. Also, in the same manner as previously described, the mask 214 of the projector means 210 of FIGURES 2 and 3 may likewise be provided at any suitable opening, or shaped slot for the purpose of providing the trace on the surface of screen 225 in the same manner referred to with respect to the mask 114 of FIGURE 1.

It can therefore be seen that the instant invention provides novel stylus position indicating means, which when enabled rapidly provides a positive indication of the exact location of the data projector scribing stylus and which may further be employed as a pointer means or other identifying means for training, instructional, or other suitable purposes.

Although there has been described a preferred embodiment of this novel invention, many variations and modifications will now be apparent to those skilled in the art. Therefore, this invention is to be limited, not by the specific disclosure herein, but only by the appending claims.

We claim:

1. Stylus position indicating means for use in data projectors having a stylus mounted upon a stylus frame which is freely movable in at least two mutually perpendicular directions for scribing an opaque coated plate illuminated by a light source through a lens system for generating a beam directed substantially along the data projector optical axis to a point on a remote viewing surface comprising illuminating means; projector means mounted to said stylus frame at a predetermined distance from the optical axis for forming a beam of light of a predetermined configuration; deflecting means positioned in the path of said last named light beam to deflect said last named light beam to be directed along the same path of light passing through the scribed opaque plate.

2. The device of claim 1 wherein said deflecting means is comprised of a first deflecting plate for deflecting said last named light beam in a direction perpendicular to said optical axis and beam splitter means for subsequently deflecting at least a portion of said last named light beam along the optical axis.

3. The device of claim 2 wherein said beam splitting means comprises a beam splitting member pivotally mounted for movement between an "in" and an "out" position; said beam splitting plate being in the path of said optical axis when in said "in" position to deflect a portion of said last named light beam along said optical axis and further being positioned out of the path of said optical axis when said stylus position indicating means is not in use to prevent deflection of said last named light beam along the optical axis.

4. Stylus position indicating means for use in data projectors having a stylus mounted upon a stylus frame which is freely movable in at least two mutually perpendicular directions for scribing an opaque coated plate illuminated by a light source through a lens system for generating a beam directed substantially along the data projector optical axis to a point on a remote viewing surface comprising illuminating means; projector means mounted to said stylus frame at a predetermined distance from the optical axis for forming a beam of light of a predetermined configuration; deflecting means positioned in the path of said last named light beam to deflect said last named light beam to be directed along the same path of light passing through the scribed opaque plate, said deflection means being positioned between the stylus and the lens system of the data projector to permit the use of a single lens system for both the data projector and said stylus position indicator.

5. Stylus position indicating means for use in data projectors having a stylus mounted upon a stylus frame which is freely movable in at least two mutually perpendicular directions for scribing an opaque coated plate illuminated by a light source through a lens system for generating a beam directed substantially along the data projector optical axis to a point or a remote viewing surface comprising illuminating means; projector means mounted to said stylus frame at a predetermined distance from the optical axis for forming a beam of light of a predetermined configuration; deflecting means poistioned in the path of said last named light beam to deflect said last named light beam to intersect the optical axis upon the viewing surface, said deflection means comprising an eccentrically mounted second lens system.

6. Stylus position indicating means for use in data projectors having a stylus mounted upon a stylus frame which is freely movable in at least two mutually perpendicular directions for scribing an opaque coated plate illuminated by a light source through a lens system for generating a beam directed substantially along the data projector optical axis to a point on a remote viewing surface comprising illuminating means; projector means mounted to said stylus frame at a predetermined distance from the optical axis for forming a beam of light of a predetermined configuration; deflecting means positioned in the path of said last named light beam to deflect said last named light beam to be directed along the same path of light passing through the scribed opaque plate, said projector means comprising a mask having a slot of a predetermined configuration for shaping the beam emitted from said projector means.

7. Stylus position indicating means for use in data projectors having a stylus mounted upon a stylus frame which is freely movable in at least two mutually perpendicular directions for scribing an opaque coated plate illuminated by a light source through a lens system for generating a beam directed substantially along the data projector optical axis, to a point on a remote viewing surface comprising illuminating means; projector means mounted to said stylus frame at a predetermined distance from the optical axis for forming a beam of light of a predetermined configuration; deflecting means positioned in the path of said last named light beam to deflect said last named light beam to be directed along the same path of light passing through the scribed opaque plate, said projector means comprising a mask having a slot of a predetermined configuration for shaping the beam emitted from said projector means, said illuminating means comprising a flexible fiber bundle having a first end positioned adjacent the data projector light source and a second end positioned adjacent said projector means mask to provide illumination for said projector means while permitting said projector means to move freely with said data projector stylus.

References Cited by the Examiner
UNITED STATES PATENTS

| | | | |
|---|---|---|---|
| 2,859,659 | 11/1958 | Fenske et al. | 88—24 |
| 3,151,927 | 10/1964 | Angst et al. | 346—29 X |
| 3,160,461 | 12/1964 | Wengryn et al. | 346—29 |
| 3,160,462 | 12/1964 | Angst et al. | 346—29 |

NORTON ANSHER, *Primary Examiner.*

VANCE A. SMITH, *Assistant Examiner.*